United States Patent
Cozzini

(10) Patent No.: US 7,481,156 B2
(45) Date of Patent: Jan. 27, 2009

(54) PROCESS FOR INJECTION OF PARTICLES IN FOOD

(75) Inventor: Ivo Cozzini, Lincolnwood, IL (US)

(73) Assignee: Cozzini, Inc., Chicago, IL (US)

( * ) Notice: Subject to any disclaimer, the term of this patent is extended or adjusted under 35 U.S.C. 154(b) by 787 days.

(21) Appl. No.: 10/499,448

(22) PCT Filed: Dec. 19, 2001

(86) PCT No.: PCT/BR01/00156

§ 371 (c)(1),
(2), (4) Date: Nov. 23, 2004

(87) PCT Pub. No.: WO03/051141

PCT Pub. Date: Jun. 26, 2003

(65) Prior Publication Data

US 2005/0095327 A1    May 5, 2005

(51) Int. Cl.
*A22C 17/00* (2006.01)
*A23L 1/31* (2006.01)

(52) U.S. Cl. ............................. 99/533; 99/535; 99/487

(58) Field of Classification Search .................. 99/532, 99/533, 535, 534, 536, 487; 241/65, 82.2, 241/82.5, 34
See application file for complete search history.

(56) References Cited

U.S. PATENT DOCUMENTS

| | | | | |
|---|---|---|---|---|
| 4,141,287 A | * | 2/1979 | Becker et al. ............. | 99/450.1 |
| 4,620,478 A | * | 11/1986 | Corominas .................. | 99/533 |
| 4,960,599 A | | 10/1990 | Cozzini et al. | |
| 5,092,528 A | | 3/1992 | Rudibaugh | |
| 5,142,971 A | | 9/1992 | Norrie | |
| 5,638,746 A | * | 6/1997 | Higashimoto ............... | 99/532 |
| 5,830,525 A | | 11/1998 | Cozzini et al. | |
| 6,386,099 B1 | * | 5/2002 | Otsuka et al. ............... | 99/487 |
| 6,763,760 B2 | * | 7/2004 | Hansen et al. ............... | 99/487 |

* cited by examiner

*Primary Examiner*—Reginald L Alexander
(74) *Attorney, Agent, or Firm*—Barnes & Thornburg LLP

(57) ABSTRACT

The present invention relates to a process for injection of refrigerated suspended particles into food products and the products resulting from such process. The present invention applies to the food industry in the field of meat products, and reveals those characteristics which are relevant for the process of preparation of said meat products suspension, to be later aggregated on larger sized meat products, as well as those characteristics which are relevant for said injection process. The main object of the present invention is to increase the final product green weight without incurring loss of flavor, shortening of shelf life, nutritional value or texture, making feasible the incorporation of smaller size pieces to a product featuring a higher commercial value. The term meat products is herein used meaning those products extracted from poultry, fish, cattle, pork, sheep, etc., both with and without fat, either in the shape of meat cut or shred, ground meat, frozen meat, semi-frozen meat or refrigerated meat.

9 Claims, 4 Drawing Sheets

PROCESS FOR INJECTION OF PARTICLES IN FOOD

CROSS REFERENCE TO RELATED APPLICATIONS

This application is a U.S. national stage application (filed pursuant to 35 U.S.C. § 371) of International PCT Patent Application No. PCT/BR01/00156, filed Dec. 19, 2001.

BACKGROUND

The present invention relates to a process for injection of refrigerated suspended particles into food products and the products resulting from such process. The present invention applies to the food industry in the field of meat products, and reveals those characteristics which are relevant for the process of preparation of said meat products suspension, to be later aggregated on larger sized meat products, as well as those characteristics which are relevant for said injection process.

The main object of the present invention is to increase the final product green weight without incurring loss of flavor, shortening of shelf life, nutritional value or texture, making feasible the incorporation of smaller size pieces to a product featuring a higher commercial value.

The term meat products is herein used meaning those products extracted from poultry, fish, cattle, pork, sheep, etc., both with and without fat, either in the shape of meat cut or shred, ground meat, frozen meat, semi-frozen meat or refrigerated meat.

The state of the art regarding the present invention can be established with the aid of several documents, among them U.S. Pat. No. 4,960,599 granted to Cozzini et al., which is herein incorporated by reference.

The systems for preparation of the suspension and for its injection in the meat products of the current state of the art may be described based on five main components:

A) Mixing silo;
B) Forced feeding reduction mill;
C) Suspension storage silo;
D) Return silo; and
E) Injection head.

Referring to FIG. 1, the function of the mixing silo (A) is to store and refrigerate the mix of brine and meat. When it reaches a temperature between −4.5° C. and −9° C., said mixture is carried to the forced feeding reduction mill (B), where it is transformed into the suspension (which is a mixture that integrates one or more liquid or oil phases with at least one solid phase). Then said suspension is carried to the suspension storage silo (C), where a heat exchanger (D) for continuous refrigeration keeps the resulting suspension temperature below 0° C. After that, the suspension is transferred, with the aid of a centrifugal pump (P), to the injection head (E), equipped with a set of injection needles (F). A conveyor (G) conveys the meat products of commercial dimensions to the injection head (E). The injection process itself takes place when a commercial dimension meat product, laid under said injection head (E), is penetrated by its set of injection needles (F). Said needles inject the suspension in multiple points of the meat product. The excess suspension generated on the injection operation is collected in the return silo (H) and sent, with the aid of a lobe pump (not shown) back to the mixing silo (A), closing the cycle.

The current state of the art presents some inconveniences.

The suspension storage silo (C) of the current state of the art systems features a single pump (P), which prevents the use of multiple injectors or injectors with multiple heads, therefore limiting the system's productivity.

Furthermore, the different values of friction and viscosity of the suspension components (meat, brine and optional additives) associated with the mechanical characteristics of the injection process cause the excess suspension collected below the injection head (E) and stored in the return silo (H) to present a different proportion between the component elements of the suspension than the suspension contained in the suspension storage silo. Usually said excess suspension presents a higher meat content than the one originally set by the forced feeding reduction mill (B) placed between the mixing silo (A) and the suspension storage silo (C). In the current state of the art systems, the return of the excess suspension from the injector to the mixing silo causes a change in the delicate balance between the suspension components, i.e. a disproportion between the brine and meat products. Said change of suspension balance in turn tends to cause a progressive yield loss in the injection process.

Another inconvenience is that the current state of the art injection systems do not allow a precise and consistent control of the injection pressure. Said injection pressure control is critical for the system's performance. If the injection pressure is too low, the suspension does not penetrate between the fibers of the meat product to be injected, thus keeping the meat product from admitting the suspension quantity originally intended for it. If the injection pressure is too high, the injection damages the meat product (sometimes even turning it to shreds) and also prevents the adequate control of the quantity of suspension aggregated to the meat product.

SUMMARY

The present invention eliminates the inconveniences of the current state of the art by the use of an improved system that incorporates a high performance sequential disc mill for the reduction of the meat products to a dimension which fosters its suspension in a mixture of water, salt and (optional) additives.

The present invention is applied to processes for the injection of suspensions into food products, preferably meat products and fibrous foods in general, as well as poultry and fish.

BRIEF DESCRIPTION OF THE DRAWINGS

The present invention will be better characterized with the aid of the annexed drawings, where.

DETAILED DESCRIPTION

Figure 1:
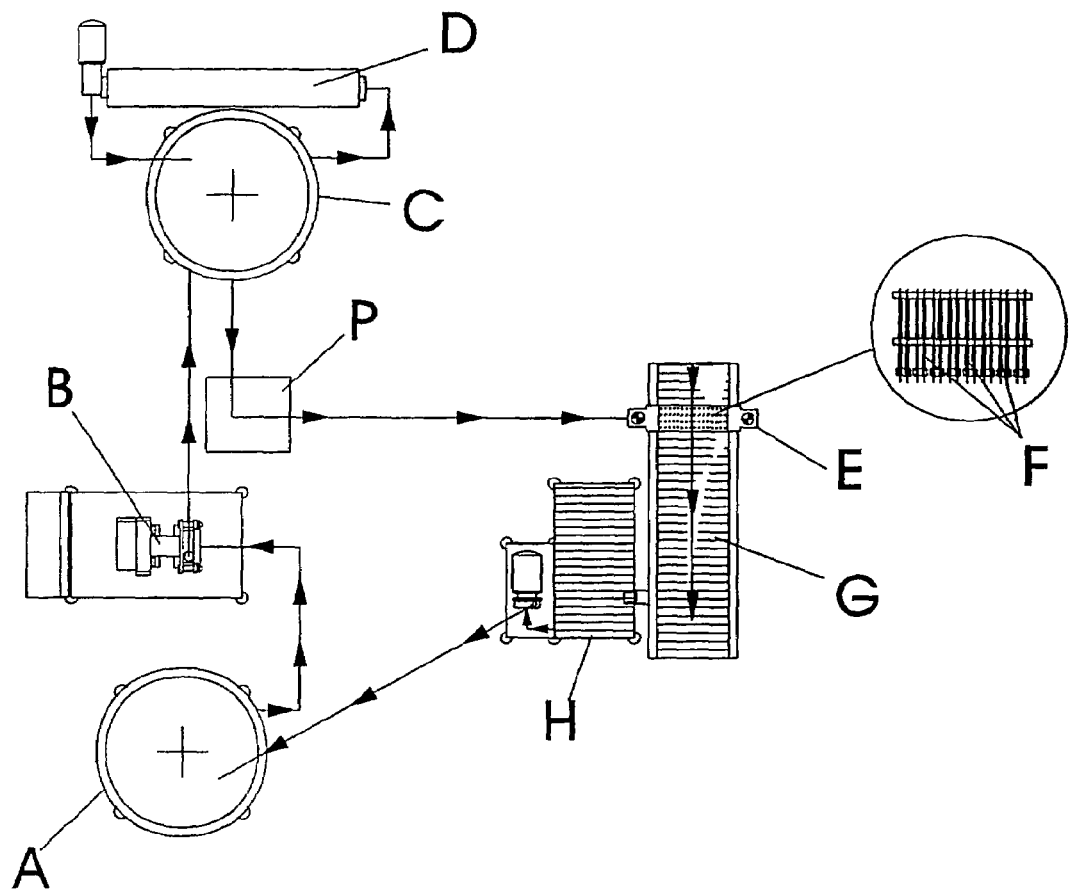
FIG. 1 is an illustrative example of the state of the art systems for the preparation of the suspension and injection, in the meat products, wherein the arrows indicate the process flow.

Based on the figures described above, it is possible to identify in the present invention a refrigerator (1), a mixing silo (2), a forced feeding primary reduction mill (3), a suspension storage silo (4), a continuous refrigeration system (5), an array of pumps (20), an array of injection heads (6), a set of injection needles (7), a conveyor for transporting the meat products to be injected (8), a return silo (9) and a forced feeding secondary reduction mill (10).

The injection needles set (7) uses different needle types according to the kind of meat product to be injected and the injection conditions.

In an alternative embodiment, the present invention eliminates the need for said injection needles, replacing it by a pressurized suspension pulse, which works in a manner very similar to the corresponding current state of the art medical devices used for vaccine injection in humans.

Figure 4:
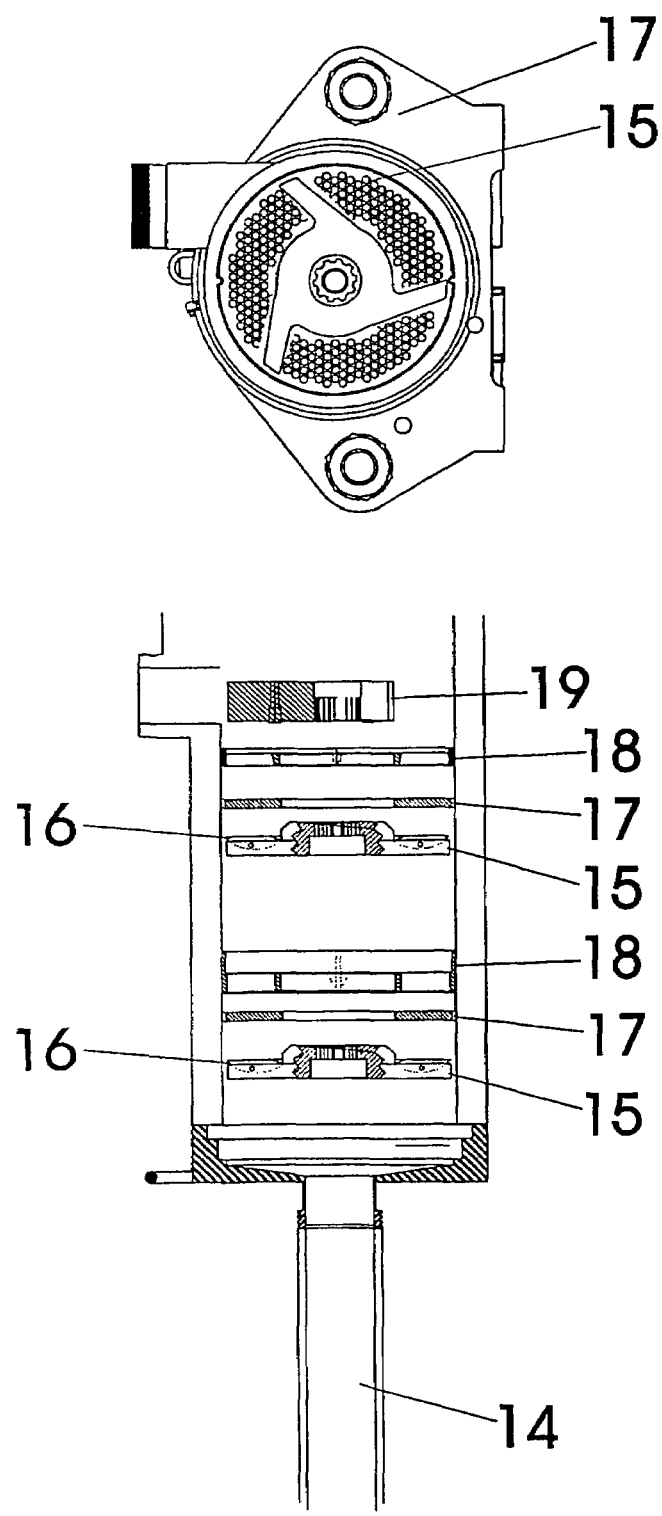
FIG. 4 details the sequential forced feeding disc mill for the reduction of meat products as incorporated to the present invention, seen in a side elevation and also a frontal view.

As shown in detail on FIG. 4, the present invention also incorporates a high performance mill (3) that operates coupled to a forced feeding system. The products to be reduced (for example a mixture containing meat products in a brine solution or water) are carried by a forced flow (with the aid of a pump—not shown—which generates pressure upstream of said flow) through a duct (14). Said duct (14) directs the flow in a direction orthogonal to the plan of a reduction or milling set.

Said reduction mill (3) comprises two or more milling sets, each one of them in turn comprising a rotating blade assembly (15), over which is mounted a certain number of inserts (16), a fixed milling disc (17) and a spacer (18). Said reduction mill (3) incorporates two or more milling sets, successive and in parallel, with the spacing between the successive sets preferably between 15.0 mm and 60.0 mm.

Each of the rotating blade assemblies (15) presents from 3 to 6 individual blades. Each of the fixed milling plates (17) presents on its surface a set of milling holes with diameters preferably between 0.6 mm and 5.0 mm. The spacer (18), the function of which is to create individual chambers to separate the successive reduction sets, is always set after the fixed milling plates (17) in order to bear the force generated by the pressure applied upstream. The pump (19) is set downstream of the last spacer (18), in order to drive the flow out of the mill.

In the process of the present invention, said mill configuration described above is used both on the forced feeding primary reduction mill (3) and the forced feeding secondary reduction mill (10).

Figure 2:
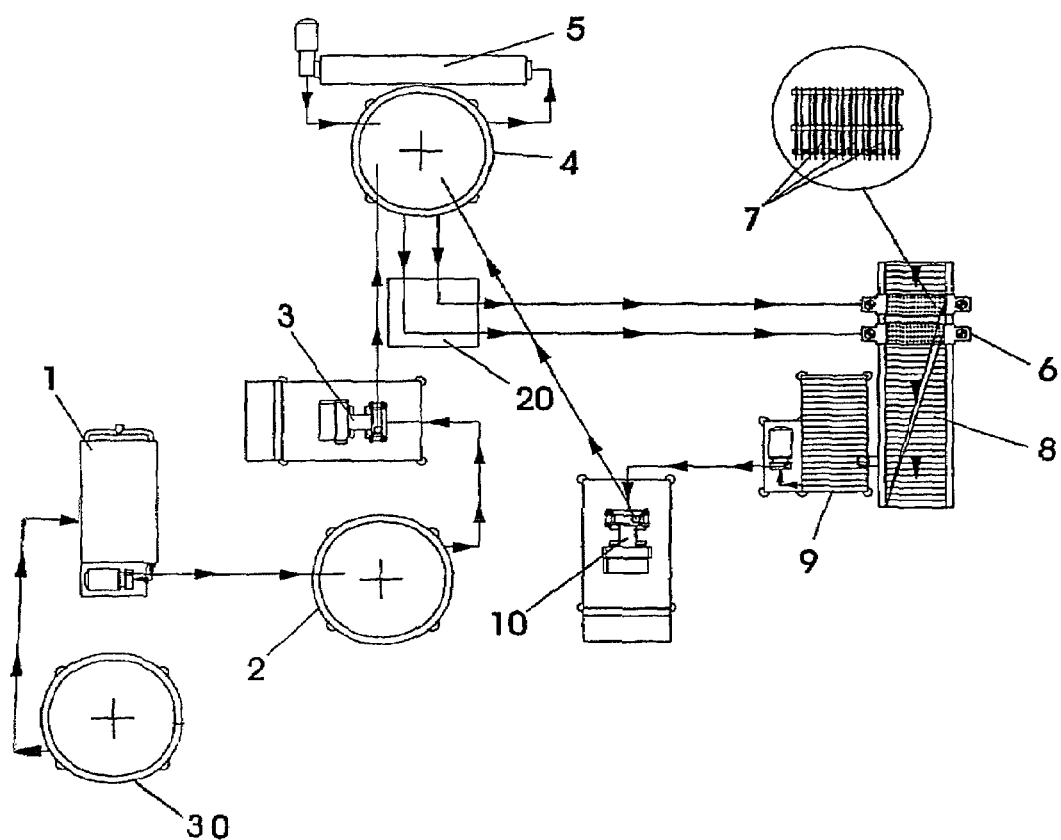
FIG. 2 is a schematic view of the present invention's system, wherein the arrows indicate the process flow.

Referring to FIG. 2, the process operation of the present invention is described below.

Initially the mixing silo (2) is loaded with the ingredients that compose the suspension to be prepared. Said ingredients comprise brine or water, cuts and/or shreds of meat products, optionally including additives such as spices, nitrates, phosphates, binding agents, etc., which act as flavor enhancers and preservatives.

Alternatively, the brine can be processed in an auxiliary silo (30) and transferred to the mixing silo (2). The brine may be cooled by passing it through the refrigerator (1) before transferring the brine to the mixing silo (2).

The mixture is made setting a proportion in weight of at least 60% of brine or water to the total weight of the suspension, with the temperature stabilized between +5° C. and −18° C. Once such conditions are achieved, a pump (not shown) drives the mixture to the primary reduction mill (3), where is initiated the reduction milling process using force feeding. Upon passing between the primary reduction mill (3) milling holes, the suspended solids of the mixture are sheared by the array of reduction sets inside the mill. The pump (19) placed immediately downstream of the last spacer (18), drives the suspension towards the suspension storage silo (4).

The purpose of transforming the mixture in a suspension is to make it more homogenous, which fosters both the mechanical performance of the injection process and the aspect of the final product.

As explained previously, after passing through the above described reduction mill (3), the suspension is expelled from the mill (3) with the aid of a pump (19) placed downstream of the last spacer (18). Coming out of the primary reduction mill (3), the suspension is transferred to the suspension storage silo (4).

Said suspension storage silo (4) may or may not incorporate a continuous refrigeration system (5). An array of pumps (20) placed downstream of the suspension storage silo (4) drives the suspension stores therein to an array of injection heads (6), where the suspension is injected into the meat products. Said injection is made by injection needles (7) arranged on the array of injection heads (6). In the present invention, said array comprises one or more injection heads or injectors placed along the path of the meat product. The operation of said heads (6) is independent, and each one of the processed meat product pieces passes successively through each one of these heads.

In spite of the pressure adjustment, a minor part of the volume of injected suspension escapes, either through the meat product fibers, drainage of the excess suspension retained inside the needles after the injection, or through the very holes created in the meat product by the penetration of the injection needles. In the alternative embodiment which uses pressurized suspension pulses instead of needles, the volume of excess suspension tends to be smaller.

Said excess suspension is collected by means of a system (not shown) of centralized collection (gravity powered) proximate to the injector and accumulates in the return silo (9), being later submitted to another cycle of reduction. Said step of reduction of the injection excess is processed in a forced feeding secondary reduction mill (10) placed in the middle of a duct that connects the exit of the return silo (9) and the suspension storage silo (4), wherein the collected excess suspension is reincorporated into the process. This avoids wastage and insures a better suspension refinement. In alternative embodiments of the present invention, which lack the suspension storage silo (4), the placing of the excess injection recuperation circuit previously described allows loading ingredients for the preparation of a new batch of mixture into the mixing silo (2), because the excess suspension may be fed directly to the injector heads (6), and the mixing silo does not have to be in service to receive the injection excess anymore.

The injection is made under pressures preferably between 0.5 bar and 9.0 bar, according to the characteristics of origin, texture, refrigeration state, etc. of the meat product to be processed. In the present invention, the injection pressure control is preferably effected through the variation of the speed of the pumps in the array of pumps (20).

Figure 3:
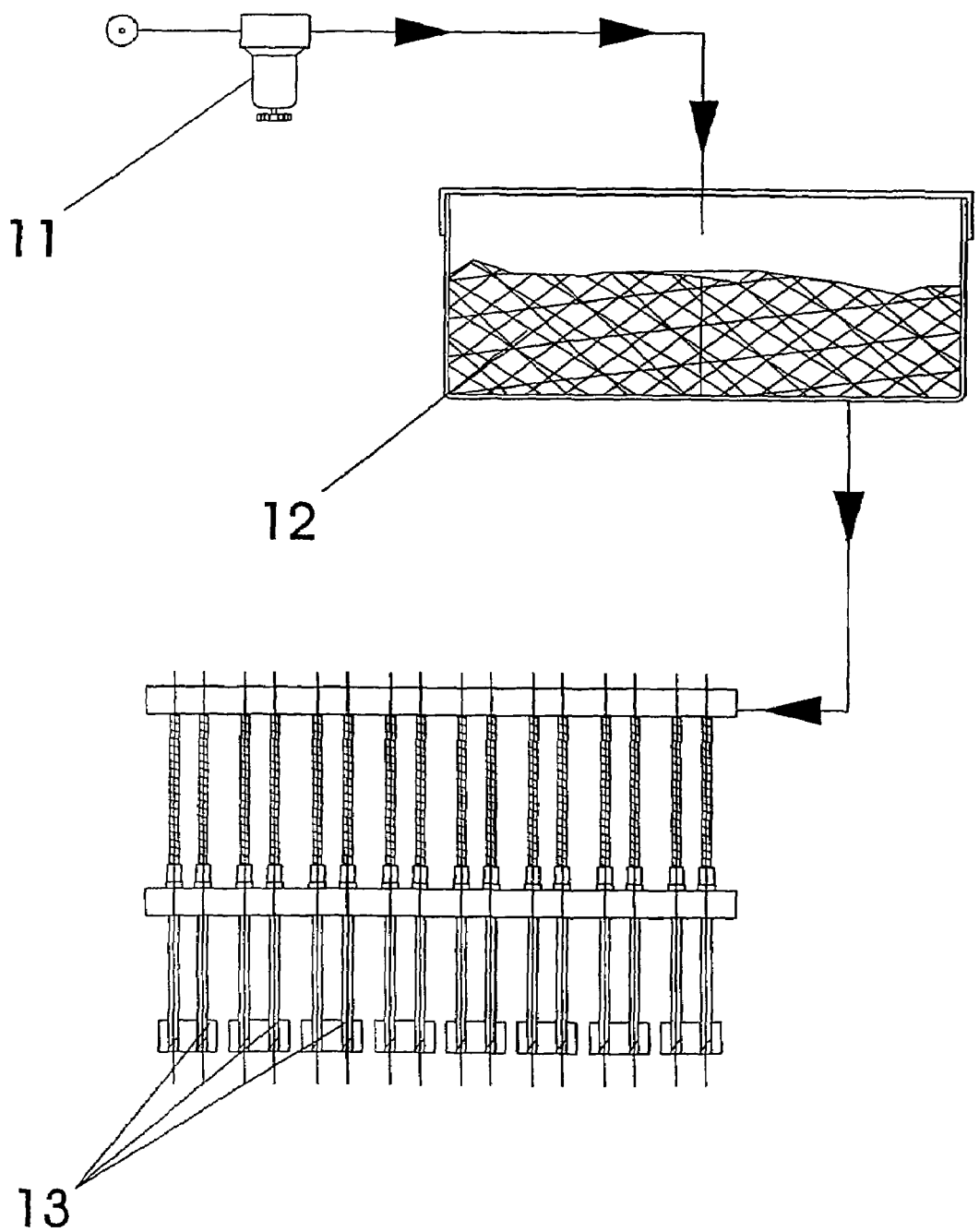
FIG. 3 details an example of an alternative embodiment for a pneumatic pressure control according to the present invention.

The present invention may present several alternative forms of injection pressure control, according to the operational needs. As alternatives to the variation of the speed of the pumps in the array of pumps (20), the injection pressure control can be effected by two alternative means. The first alternative for injection pressure control is based on the adjustment of a pressure regulation valve (not shown) placed between the suspension storage silo (4) and the array of injection heads (6), equipped with a return circuit to the suspension storage silo (4). The second alternative for injection pressure control is based in the use of a pneumatic device as illustrated in FIG. 3. Said pneumatic device provides injection pressure control in the following manner:

An enclosed tank (12), placed between the suspension storage silo (4) and the injection heads (6), or alternatively a small reservoir placed inside the injector itself, stores the suspension and also a certain volume of air. A pressure regulation valve (11) controls the pressure of the air contained inside the enclosed tank (12). Sharing the same manifold, the air and the suspension volume contained by the enclosed tank (12) consistently present the same pressure values. The injection needle set (13) is directly connected to the bottom of the enclosed tank (12) by means of a duct.

The present invention offers multiple advantages compared to the current state of the art.

The placement of two or more distribution pumps in the array of pumps (20) connected to the suspension storage silo (4) allows the use of several injectors or multiple headed injectors, therefore fostering the system's performance.

The excess suspension collection system of the present invention fosters the processing efficiency, avoiding wastage.

The additional reduction step of said excess injection ensures the consistency of the proportion between the suspension component elements, warranting a constant balancing of the suspension provided to the array of injection heads (6), enhancing the performance of the injection process.

Another advantage of the present invention lies in the degree of precision and consistency of the injection pressure control, critical for the system performance. The injection pressure control which characterizes the present invention ensures that the quantity of suspension added to the meat product is exactly the quantity originally planed, preserving the integrity of the processed meat product.

Finally, another advantage of the present invention is the high processing speed afforded by the use of forced reduction milling, which accelerates the conversion of the mixture into a suspension.

Those skilled in the art will promptly realize that the description of one of the preferential embodiments previously given does not limit the application of the present invention to processes featuring those characteristics described herein, so that it can be applied to other similar processes without abandoning the scope and inventive spirit covered by the following set of claims.

What is claimed is:

1. A system for injection of refrigerated suspended particles into food products comprising:
    a mixing silo, configured to receive a mixture of ingredients comprising a suspension;
    a first reduction mill connected to said mixing silo and configured to receive and pressurize said mixture from said mixing silo, said first reduction mill having a plurality of reduction sets configured to shear said mixture within said first reduction mill;
    a suspension storage silo connected to said primary forced feed reduction mill and configured to receive said suspension comprising said sheared mixture;
    a pressure supply device connected to said suspension storage silo, said pressure supply device configured to receive said suspension from said suspension storage silo and deliver said suspension under pressure to an array of injection heads, each injection head having a plurality of injectors;
    a conveyor for transporting the food products into proximate relation with each of said injection heads in succession, wherein said injectors deliver said suspension into the food product under pressure, and wherein said conveyor transports the food products away from said injection heads after injection of said suspension;
    a return silo configured to receive and collect a portion of said suspension not retained by the food product; and
    a second reduction mill connected to said return silo, said second reduction mill having a plurality of reduction sets configured to process said collected portion of suspension within said second reduction mill before discharging said collected portion of suspension into said suspension storage silo.

2. The system of claim 1 further comprising an auxiliary silo, wherein said auxiliary silo is configured to hold a brine solution for stabilization at a temperature between +5° C. and −18° C. before said brine solution is fed into said mixing silo.

3. The system of claim 1 wherein said pressure supply device comprises a plurality of distribution pumps, each distribution pump being independently connected to one of said array of injection heads for independent delivery and control of said suspension to said injectors.

4. The system of claim 1 wherein said pressure supply device comprises:
    an enclosed tank, said enclosed tank being configured to receive said suspension from said suspension storage silo;
    an air supply connected to said enclosed tank, said air supply having a pressure regulating valve upstream from said enclosed tank set to maintain a predetermined pressure; and
    a suspension outlet, said suspension outlet connecting said enclosed tank with one or more of said array of injection heads.

5. The system of claim 1 further comprising a heat exchanger connected to said suspension storage silo, said heat exchanger configured to remove heat from said suspension within said suspension storage silo.

6. The system of claim 5 wherein said heat exchanger is configured to maintain the temperature of the suspension at less than 0° C.

7. A system for injection of refrigerated suspended particles into food products comprising:
    a mixing silo, configured to receive a mixture of ingredients comprising a suspension;
    a first reduction mill connected to said mixing silo and configured to receive and pressurize said mixture from said mixing silo, said first reduction mill having
        a pressure generating device disposed upstream of a mill inlet duct,
        a plurality of milling units, successive and in parallel, each of said milling units comprising a rotating blade assembly, a plurality of inserts mounted on said blade assembly, a fixed milling disc parallel to and spaced from said blade assembly and having a plurality of apertures therein, and a spacer parallel to and spaced apart from each milling disc,
        wherein said inlet duct directs flow orthogonal to said milling units, and
    a pump disposed downstream of the last spacer;
    a suspension storage silo connected to said first reduction mill and configured to receive said suspension comprising said sheared mixture;
    a pressure supply device connected to said suspension storage silo, said pressure supply device configured to receive said suspension from said suspension storage silo and deliver said suspension under pressure to an array of injection heads, each injection head having a plurality of injectors;
    a conveyor for transporting the food products into proximate relation with each of said injection heads in succession, wherein said injectors deliver said suspension into the food product under pressure, and wherein said conveyor transports the food products away from said injection heads after injection of said suspension;
    a return silo configured to receive and collect a portion of said suspension not retained by the food product; and
    a second reduction mill connected to said return silo, said second reduction mill having a plurality of reduction sets configured to process said collected portion of suspension within said second reduction mill before discharging said collected portion of suspension into said suspension storage silo.

8. The system of claim 7 wherein each of said plurality of milling units is spaced from an adjacent milling unit at a distance of between 15.0 mm and 60.0 mm.

9. The system of claim 7 wherein the diameter of each of said plurality of apertures within said milling disc is between 0.6 mm and 5.0 mm.

* * * * *